United States Patent
Vande Voort et al.

(10) Patent No.: US 9,060,465 B2
(45) Date of Patent: Jun. 23, 2015

(54) TRUNK SHAKER ISOLATOR

(71) Applicant: Oxbo International Corporation, Byron, NY (US)

(72) Inventors: Michael Vande Voort, Lynden, WA (US); Michael Ter Beek, Lynden, WA (US)

(73) Assignee: Oxbo International Corporation, Byron, NY (US)

(*) Notice: Subject to any disclaimer, the term of this patent is extended or adjusted under 35 U.S.C. 154(b) by 48 days.

(21) Appl. No.: 13/789,117

(22) Filed: Mar. 7, 2013

(65) Prior Publication Data

US 2014/0075914 A1    Mar. 20, 2014

Related U.S. Application Data

(60) Provisional application No. 61/703,091, filed on Sep. 19, 2012.

(51) Int. Cl.
| | |
|---|---|
| A01D 46/00 | (2006.01) |
| A01D 75/00 | (2006.01) |
| F16F 7/00 | (2006.01) |
| A01D 46/26 | (2006.01) |
| F16F 1/371 | (2006.01) |
| A01D 46/28 | (2006.01) |

(52) U.S. Cl.
CPC . *A01D 75/00* (2013.01); *F16F 7/00* (2013.01); *A01D 46/26* (2013.01); *F16F 1/371* (2013.01); *A01D 46/28* (2013.01)

(58) Field of Classification Search
CPC ....... A01D 46/00; A01D 46/26; A01D 46/28; A01D 2046/266
USPC .......... 56/329, 330, 340.1; 428/35.8, 36.1, 76
See application file for complete search history.

(56) References Cited

U.S. PATENT DOCUMENTS

| | | | |
|---|---|---|---|
| 3,667,797 A * | 6/1972 | Kilby | 294/103.1 |
| 4,064,686 A | 12/1977 | Whitted et al. | |
| 4,208,861 A | 6/1980 | Tennes et al. | |
| 4,286,426 A | 9/1981 | Orlando et al. | |
| 4,418,521 A | 12/1983 | Orlando et al. | |
| 4,521,468 A * | 6/1985 | Brandt | 428/35.8 |
| 4,621,488 A | 11/1986 | Claxton | |
| 5,074,108 A | 12/1991 | Claxton et al. | |
| 5,583,729 A | 12/1996 | Hassler et al. | |
| 5,647,194 A * | 7/1997 | Scott et al. | 56/328.1 |
| 5,842,334 A | 12/1998 | Slates | |

(Continued)

OTHER PUBLICATIONS

Admitted Prior Art-A, Metal Pipe type Mount with rubber and steel insert, FMC, 1 page.

(Continued)

*Primary Examiner* — Robert Pezzuto

(74) *Attorney, Agent, or Firm* — Merchant & Gould, P.C.

(57) ABSTRACT

A fruit harvester includes a chassis; a motor; wheels; and a trunk shaker assembly. The shaker assembly includes engagement members configured to engage plants to loosen fruit. A mount connects the engagement members to a drive mechanism and includes an elastomeric block. The block includes a first passage formed therein extending from one side to an opposite side. Second passages extend from a third side to an opposite fourth side. A first tubular insert extends into the first passage and a second tubular inserts extend into the second passage. A backing plate is adjacent the fourth side and has orifices aligned with the second passages.

20 Claims, 11 Drawing Sheets

(56) References Cited

U.S. PATENT DOCUMENTS

| | | | |
|---|---|---|---|
| 5,927,056 A * | 7/1999 | Renehan | 56/340.1 |
| 6,003,294 A | 12/1999 | Fitzgerald et al. | |
| 6,082,721 A | 7/2000 | Kingsley | |
| 6,978,591 B2 * | 12/2005 | Zehavi et al. | 56/340.1 |
| 7,500,342 B2 * | 3/2009 | Merant et al. | 56/330 |
| 7,810,307 B2 * | 10/2010 | Pellenc et al. | 56/340.1 |

OTHER PUBLICATIONS

Admitted Prior Art-B, Mount having rubber block with 1/2" threaded studs out each side, AG-Right Enterprises, MAdera, CA, 1 page.

Admitted Prior Art C, Urethane "Dogbone" mount with metal plates embedded, sold by Aim Enterprises, Lodi, CA, 1 page.

* cited by examiner

TRUNK SHAKER ISOLATOR

BACKGROUND OF THE INVENTION

1. Field of the Invention

The present invention relates to a harvester and in particular, to a trunk shaker type harvester with an improved mount to isolate various components from at least a portion of the vibration.

2. Description of the Prior Art

Trunk shaker type harvesters are well known and used for harvesting grapes, berries and other crops in a continuous row of vines, bushes or trees. In one conventional configuration, trunk shaker harvesters have an over the row type configuration with a shaker head suspended at a center portion of the harvester. The harvester also includes a collection system that catches the fruit after it is dislodged, cleans it and conveys it to a temporary container, or to a truck, wagon or other transport vehicle.

Trunk shakers may utilize skis or other elements to engage the trunk of the plants as the harvester advances along each row and shake the plants to dislodge the fruit or other crops. The shaking mechanism typically uses a weight assembly that pivots the shaker mechanism in a reciprocating motion and imparts a shaking action to the trunk. Many other types of harvesters for other applications using different shaking devices and different configuration are also widely used.

A common problem with trunk shaker type harvesters is damage to the trunk of the plant. It can be appreciated that solid mounting of the trunk engaging elements to the shaker head may damage the vines or trees by scraping and/or removing the bark. Another problem with such devices is that vibration is transmitted back through the shaker drive mechanism into the harvester.

To address these problems, an elastomeric connection has been used between the skis and the mounting arms of the shaker head. Such a connector acts as a damper and absorbs some of the forces and reduces vibrations imparted to the harvester. It has also been found that damage to the vines is reduced. Such connectors typically use rubber that is often vulcanized to metal and has taken on various configurations. Unfortunately, the connectors typically have a very short useful life and fail after a short time, requiring constant replacement. In addition, the connectors may not provide damping in all directions and certain types of unwanted vibrations may still be imparted to the harvester and/or to the plants.

It can be seen then that a new isolator for shaker type harvesters is needed. Such an isolator should provide for easy mounting and be interchangeable for easy replacement. Moreover, such an isolator should be sufficiently durable that constant replacement is not required and down time is minimized. Such an isolator should also provide proper damping in all directions to protect the harvester and the plants from damage. The present invention addresses these as well as other problems associated with damping mounts for shaker type harvesters.

SUMMARY OF THE INVENTION

The present invention relates to a trunk shaker harvester and to an improved system and method for damping vibrations and isolating the trunk engagement members from the rest of the shaking mechanism and harvester. The harvester may be of any conventional design that imparts a shaking mechanism to engage the trunks or branches of trees, bushes or vines and shake fruit, nuts or vegetables loose. In one embodiment, the harvester is an over the row type harvester with a collection and conveyor system transporting fruit for transport and further processing.

The harvester typically includes a shaker mechanism that may use reciprocating weights to impart an oscillating motion to engagement members for shaking the trees or vines. In one embodiment, the shaker mechanism includes reciprocating weights and a shaker frame supporting opposed ski type engagement members that engage the trunks of the trees or vines. The skis include angled diverging entry portions and exit portions to facilitate alignment and smooth transition to position the skis on opposite sides of the plants to minimize damage to the trunks of the vines or trees. As the harvester advances along the row, the skis engage the trunk and impart a reciprocating motion that also shakes the trunk and to loosen the fruit, nuts or vegetables.

To provide a partial damping effect between the skis and the shaker mechanism, an isolator is used for mounting the skis to the shaker frame. The isolator includes a urethane, somewhat flexible mounting block in one embodiment. The block may be a substantially rectangular element and includes a first orifice extending in a first direction for receiving a bushing. The bushing may have a sleeve as well as an end cap or opposed caps and provides for mounting bolts to extend through the bushing. The bushing facilitates rotation as well as providing protection to minimize wear to the block.

Extending in a transverse direction to the bushing orifice are the mounting orifices spaced apart and extending through the block. The orifices may also include reinforcement sleeves that are configured for receiving additional mounting bolts for mounting to the frame of the shaker assembly. In one embodiment, the block includes four mounting orifices and associated sleeves with the first orifice intermediate and perpendicular to two pairs of the mounting orifices.

The isolator assembly may also include a backing plate to provide additional reinforcement. The backing plate includes holes aligned with the orifices for mounting to the frame and receives the bolts extending through the sleeves and orifices as well as the holes of the backing plate. The first orifice for the bushing is positioned closer to the side proximate the backing plate in one embodiment.

The block may have a hardness of approximately 95 Shore A although softer or harder materials may also be used depending upon the application and particular mounting requirements. The isolator device utilizes materials and spacing with sleeves and a backing plate that provides increased durability as compared to previous designs. The isolator device achieves superior performance by providing sufficient isolation to minimize damage to the bark as well as limit feedback through the shaker system and to the harvester. Moreover, the isolator system provides for being easily interchanged and replaced should elements wear out or become damaged. The isolator is inexpensive and easy to manufacture while providing surprising results for durability and isolation.

These features of novelty and various other advantages that characterize the invention are pointed out with particularity in the claims annexed hereto and forming a part hereof. However, for a better understanding of the invention, its advantages, and the objects obtained by its use, reference should be made to the drawings that form a further part hereof, and to the accompanying descriptive matter, in which there is illustrated and described a preferred embodiment of the invention.

BRIEF DESCRIPTION OF THE DRAWINGS

Referring now to the drawings, wherein like reference numerals and letters indicate corresponding structure throughout the several views.

DETAILED DESCRIPTION OF THE PREFERRED EMBODIMENT

Figure 1:
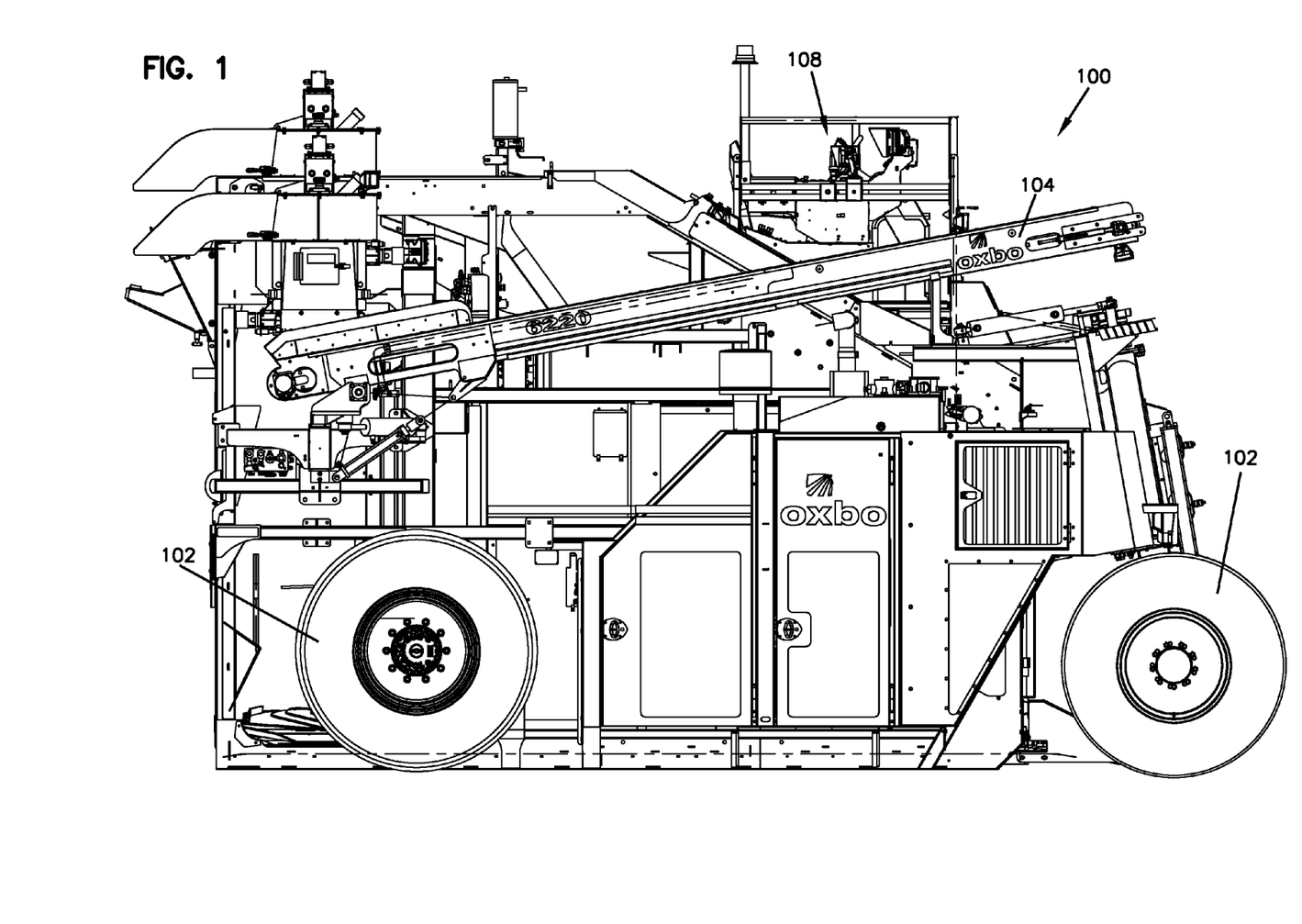
FIG. 1 is a side elevational view of a harvester having a shaking mechanism.
Figure 2:
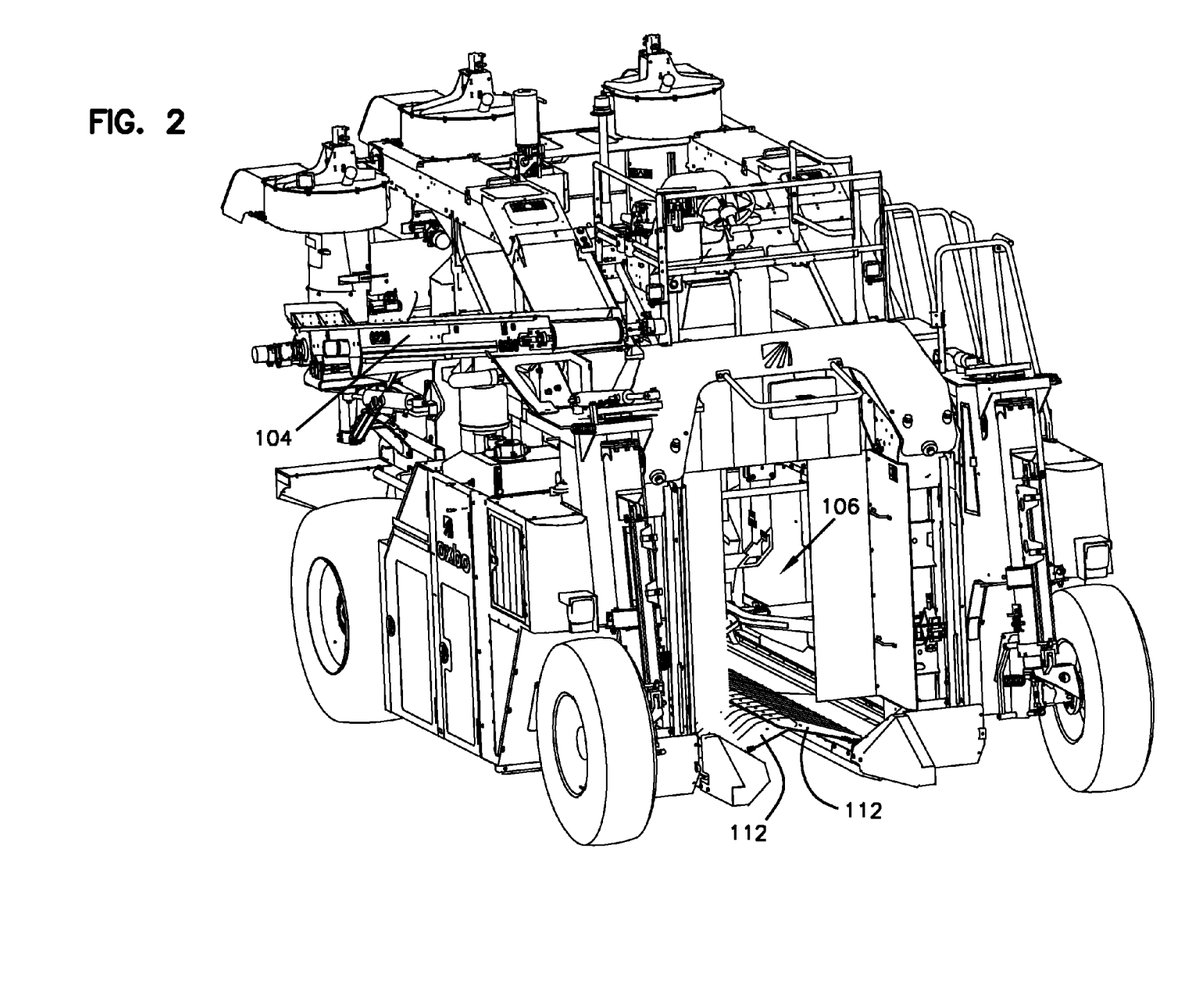
FIG. 2 is a perspective view of the harvester shown in FIG. 1.
Figure 3:
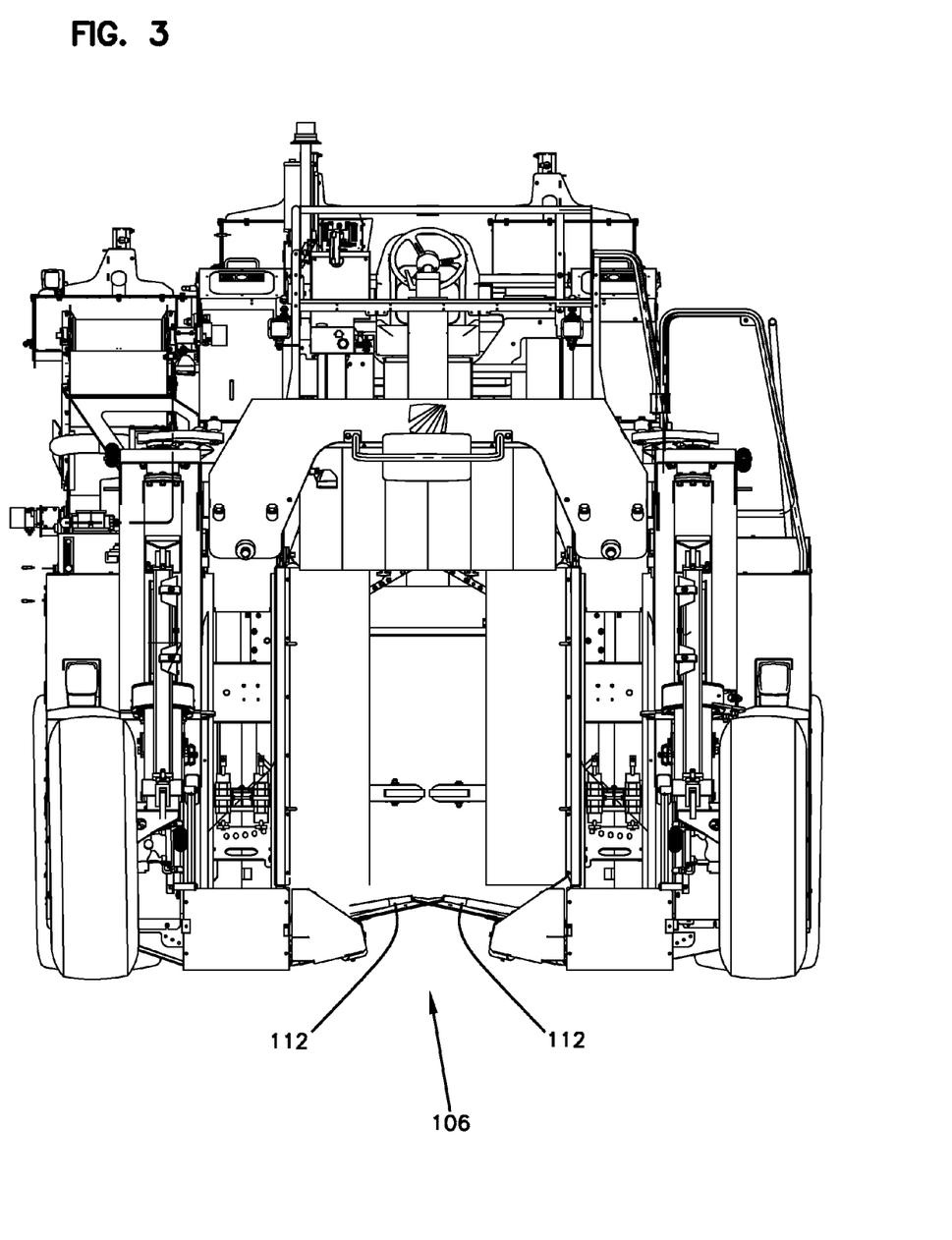
FIG. 3 is a front elevational view of the harvester shown in FIG. 1.

Referring to the drawing figures and in particular to FIG. 1, there is shown a harvester, generally designated (100). The harvester (100) is a trunk shaker type harvester configured as an over the row harvester for shaking trunks of vines, bushes or trees to remove fruit, vegetables or nuts. The harvester (100) includes wheels (102), a motor, and a cab or operator's position (108). As shown in FIGS. 2 and 3, the harvester (100) also includes a trunk shaker system (106) and various conveyors (104) that may include buckets to transport the harvested fruit, nuts or vegetables. Plates or wings (112) form a seal below the shaking system (106) and above the ground and around the trunk of the vines or trees, as shown in FIG. 2 and catch loosened fruit.

Figure 4:
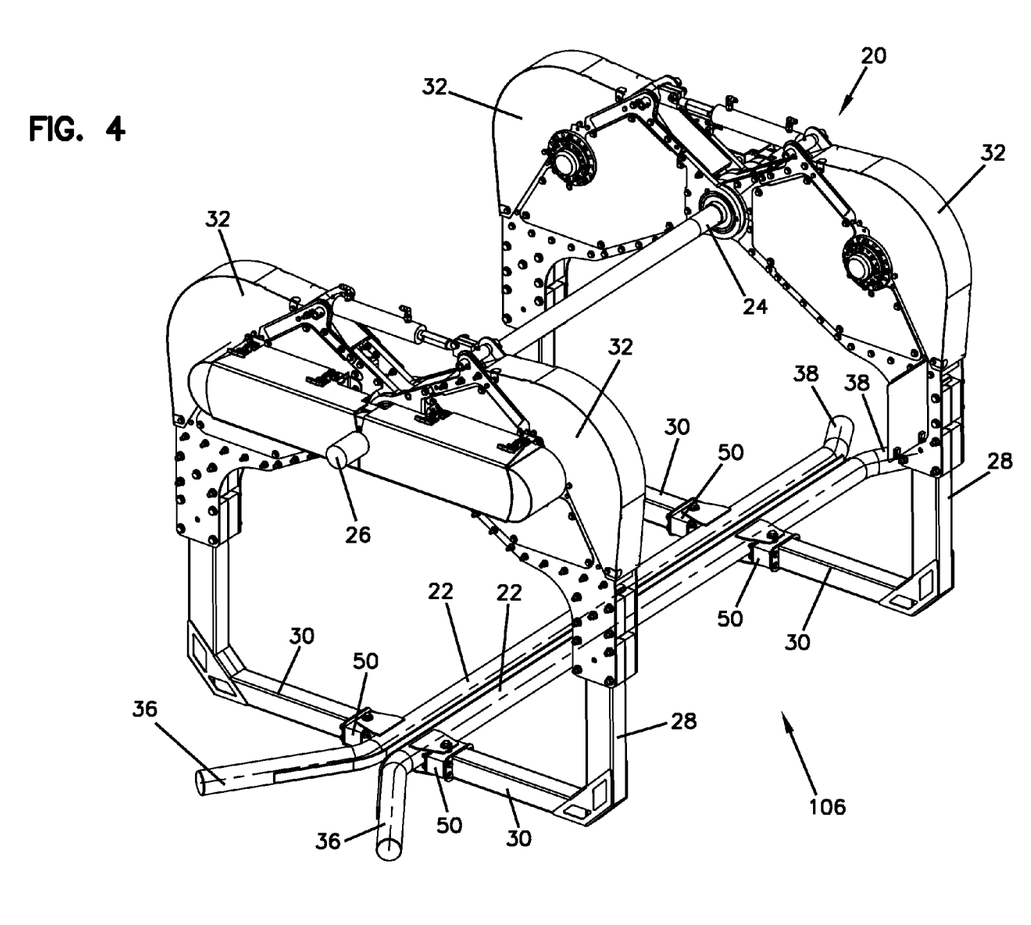
FIG. 4 is a perspective view of the shaking mechanism shown in FIG. 2.
Figure 5:
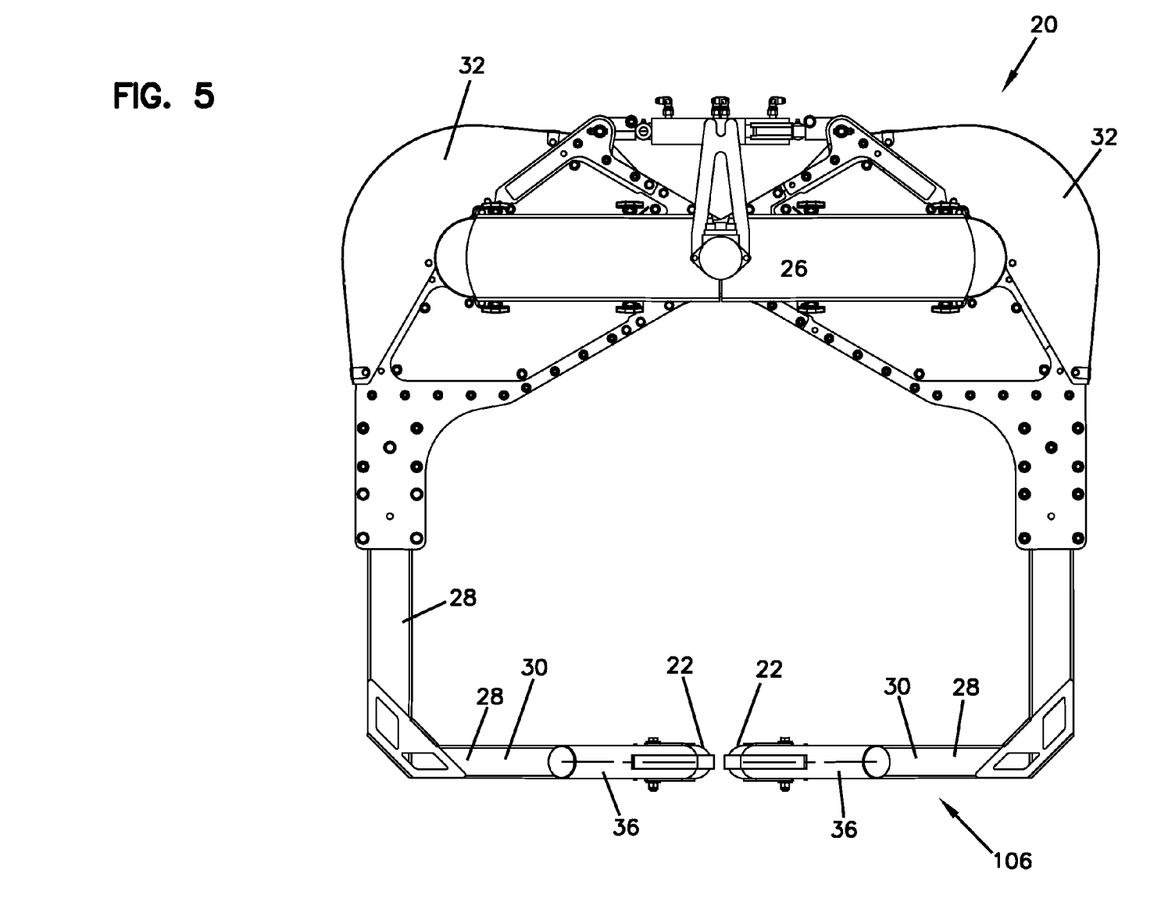
FIG. 5 is a front elevational view of the shaking mechanism shown in FIG. 4.
Figure 6:
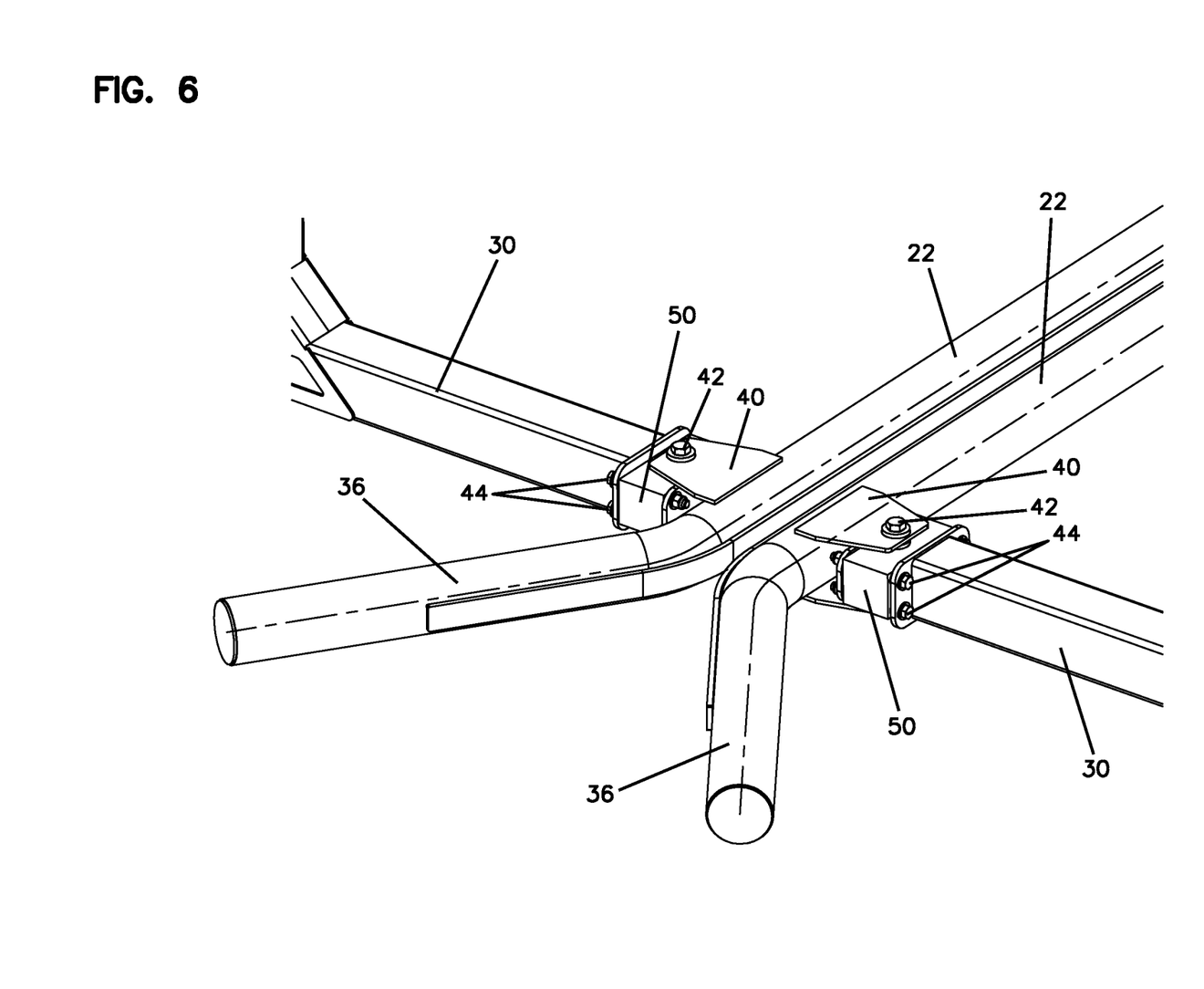
FIG. 6 is a detail perspective view of the skis and isolator for the shaking mechanism shown in FIG. 4.

Referring now to FIGS. 4-6, the shaker system (106) includes a shaking mechanism (20) including a drive shaft (24) and a motor such as a hydraulic motor (26). The shaker mechanism (20) includes a frame (28) including lower arms (30) for supporting plant engaging members, as explained hereinafter. Housings (32) include reciprocating weights that impart oscillation to the shaker mechanism that is transmitted to the trunks of the vines, bushes or trees. Extending from each of the lower arms (30) is an isolator assembly (250) connected to mounting flanges (40) by bolts (42). The isolator assemblies connect to plant engaging members generally referred to as skis (22). The skis (22) are configured for engaging the trunks of the trees or vines. Skis (22) generally have an angled front section (36) and an angled rear section (38). The skis (22) are mounted so that the angled front sections (36) diverge and the angled rear sections (38) diverge. The diverging sections (36) and (38) accommodate variations in the row and align the mechanism to ensure that the trunks feed enter correctly into the skis (22) and are maintained at a proper position between the skis (22) as the harvester (100) advances.

Figure 7:
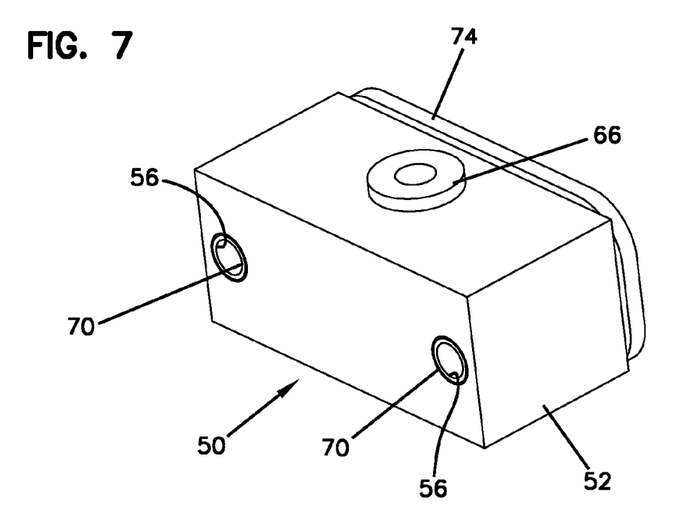
FIG. 7 is a perspective view of the isolator for the shaking mechanism shown in FIG. 4.
Figure 8:
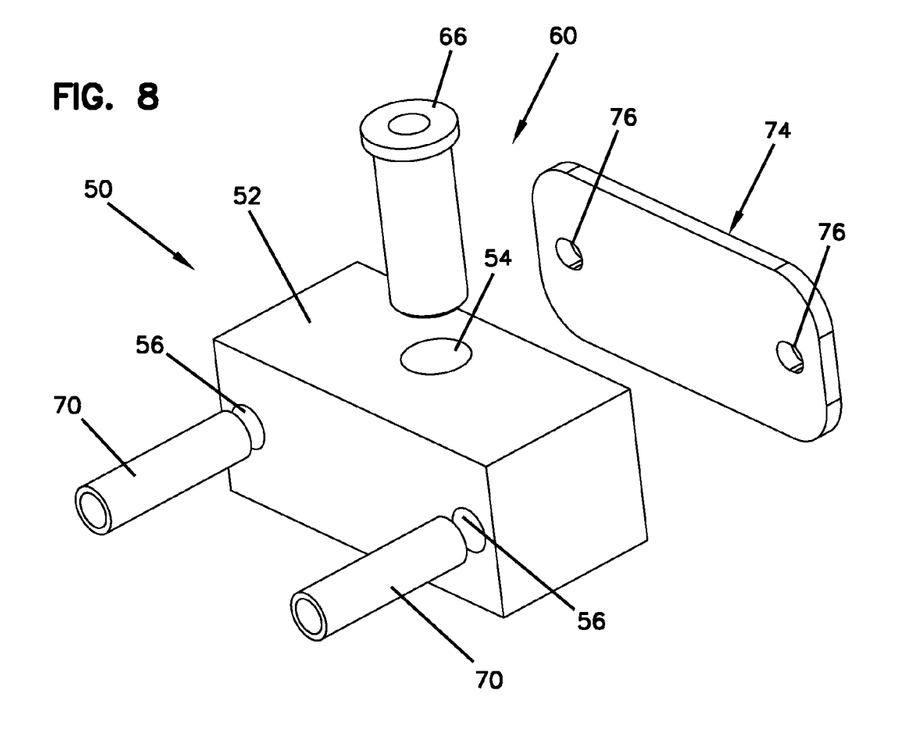
FIG. 8 is an exploded perspective view of the isolator shown in FIG. 7.
Figure 9:
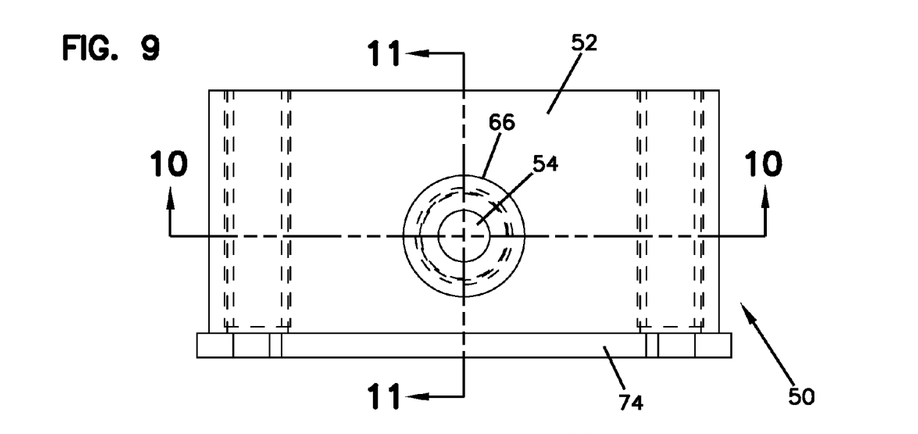
FIG. 9 is a front elevational view of the isolator shown in FIG. 7.
Figure 10:
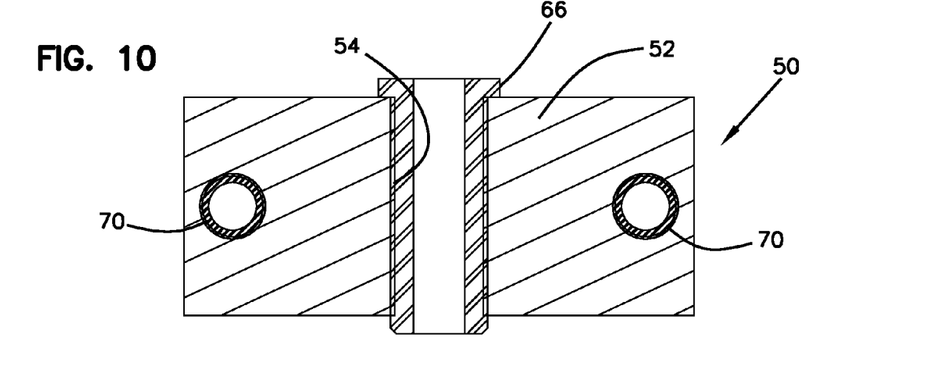
FIG. 10 is a sectional view taken along line 10-10 of FIG. 9.
Figure 11:
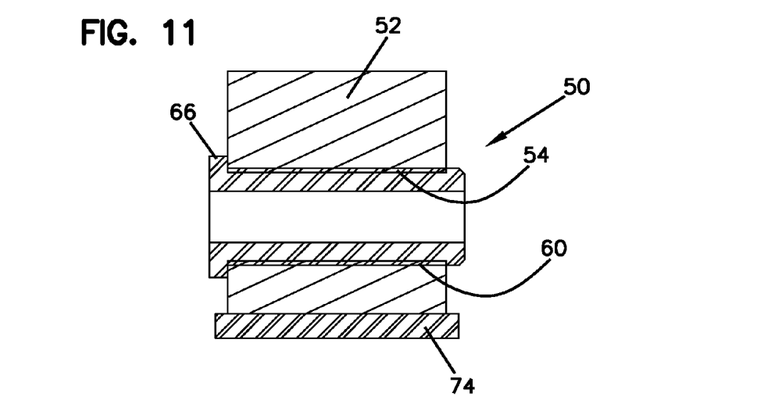
FIG. 11 is a sectional view taken along line 11-11 of FIG. 9.
Figure 12:
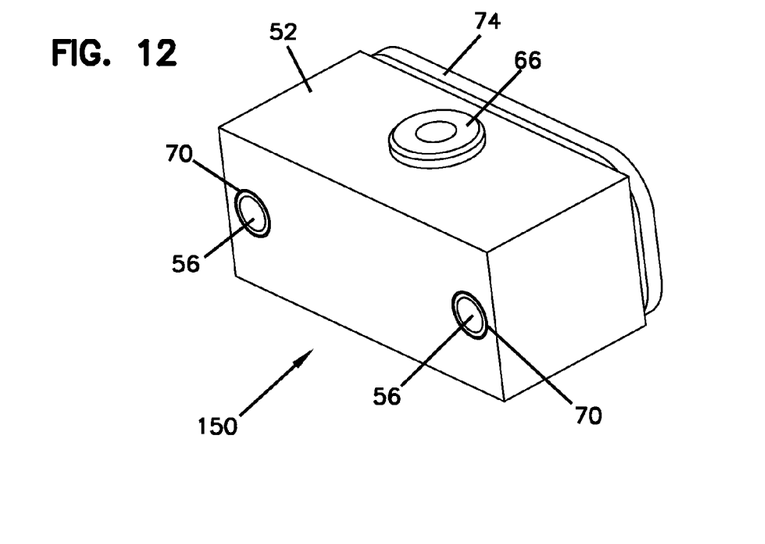
FIG. 12 is a perspective view of a second embodiment of the isolator for the shaking mechanism shown in FIG. 4.
Figure 13:
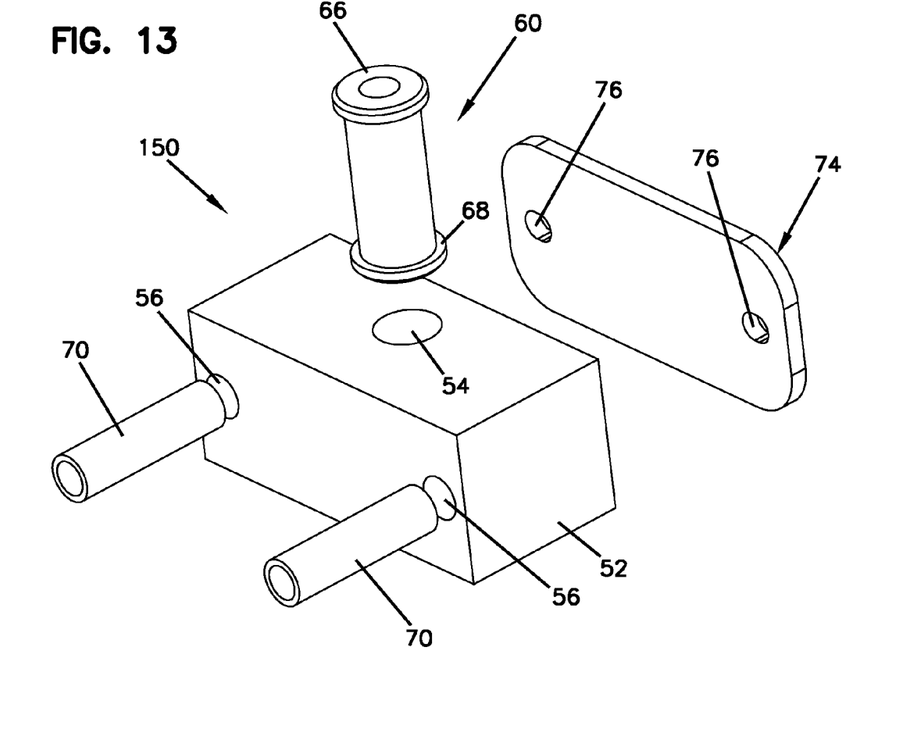
FIG. 13 is an exploded perspective view of the isolator shown in FIG. 12.
Figure 14:
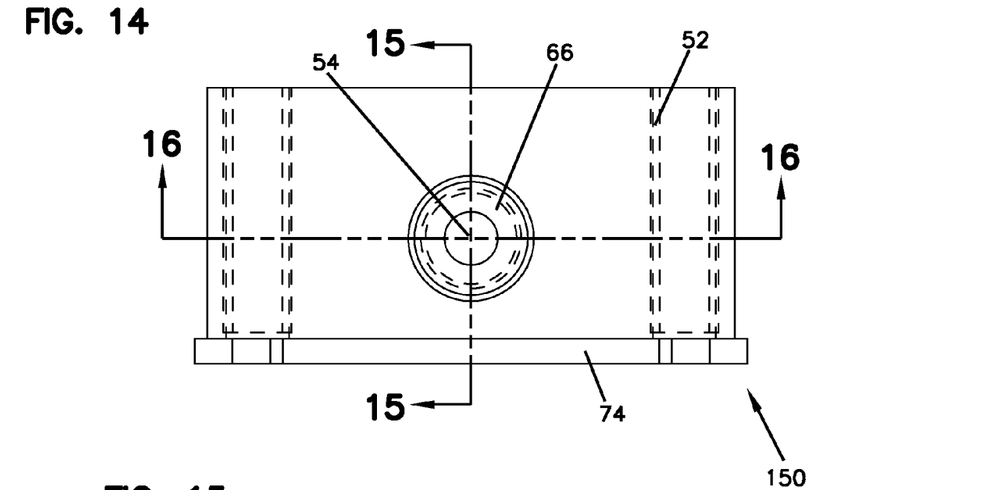
FIG. 14 is a front elevational view of the isolator shown in FIG. 12.
Figure 15:
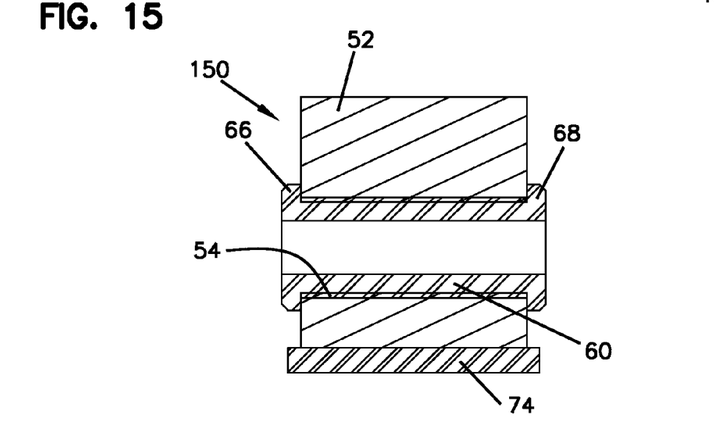
FIG. 15 is a sectional view taken along line 15-15 of FIG. 14.
Figure 16:
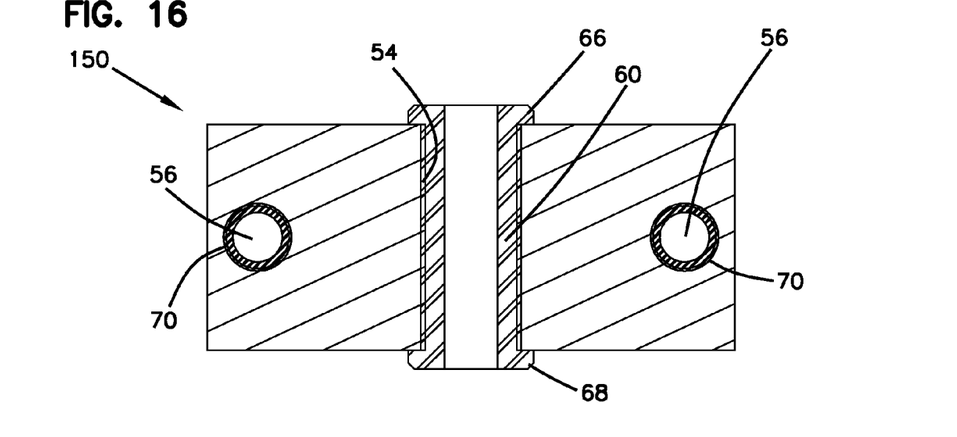
FIG. 16 is a sectional view taken along line 16-16 of FIG. 14.

Referring now to FIGS. 7 and 8, there is shown a first embodiment of an isolator according to the principles of the present invention and generally designated (50). The isolator assembly (50) includes a block (52). The block (52) is a generally rectangular block and made of a durable urethane material. It has been found that a block material with a hardness of 95 Shore A provides superior performance and proper damping and isolation as well as achieving durability and reliability. However, the hardness of the block (52) may be changed depending upon the particular application.

Extending through one face of the block (52) is a first orifice (54) configured for receiving a bushing (60). One or more mounting orifices (56) extend in a generally perpendicular direction to the bushing orifice (54). The mounting orifices (56) are spaced apart from one another and from the bushing orifice (54) to provide a continuous minimum thickness of the block (52) and to impede tearing or ripping between adjacent orifices. To provide additional reinforcement and support, the first orifice (54) receives a bushing (60) having a cylindrical sleeve type body forming a center conduit extending the length of the bushing (60). In the embodiment shown, the bushing (60) includes an end cap (66) that extends radially outward and forms a flange over the bushing orifice (54) and on a surrounding portion the block (52) and provides additional reinforcement for the block material.

A sleeve (70) extends through each of the mounting orifices (56) and is configured for receiving an associated mounting bolt (44), as shown in FIG. 6. In the embodiment shown, the isolator block (52) includes four spaced apart mounting orifices (56). The mounting orifices (56) are spaced apart from one another and generally near each corner. The mounting orifices (56) extend from one face to an opposite face of the block (52). The bushing orifice (54) is intermediate pairs of the mounting orifices (56) and extends in a direction generally perpendicular to the axis of mounting orifices (56) between two other opposite faces of the mounting block (52).

The isolator assembly also includes a backing plate (74). The backing plate (74) includes orifices (76) aligned with the mounting orifices (56) of the urethane block (54). The bolts (44) extend through the sleeves (70) and orifice (76) for mounting the isolator assembly (50). The mounting orifice (54) is positioned slightly closer to the face receiving the backing plate (74) in the embodiment shown.

Referring now to FIGS. 12-16, there is shown a second embodiment of the isolator assembly generally designated (150). The alternate embodiment is similar in all respects to the isolator assembly (50) shown in FIGS. 3-10 except for the bushing includes an end cap (66) as well as a second end cap (68) at an opposite end.

Figure 17:
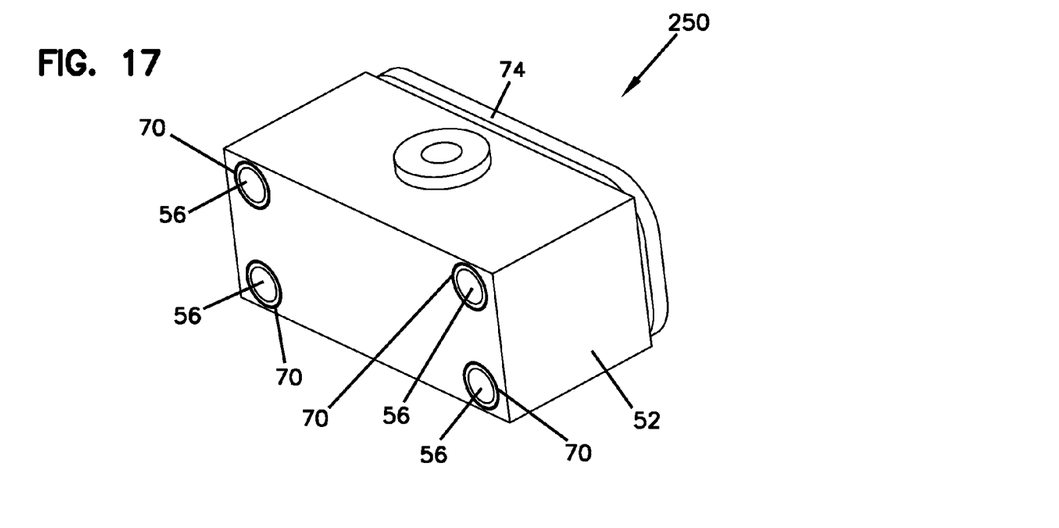
FIG. 17 is a perspective view of a third embodiment of the isolator for the shaking mechanism shown in FIG. 4.
Figure 18:
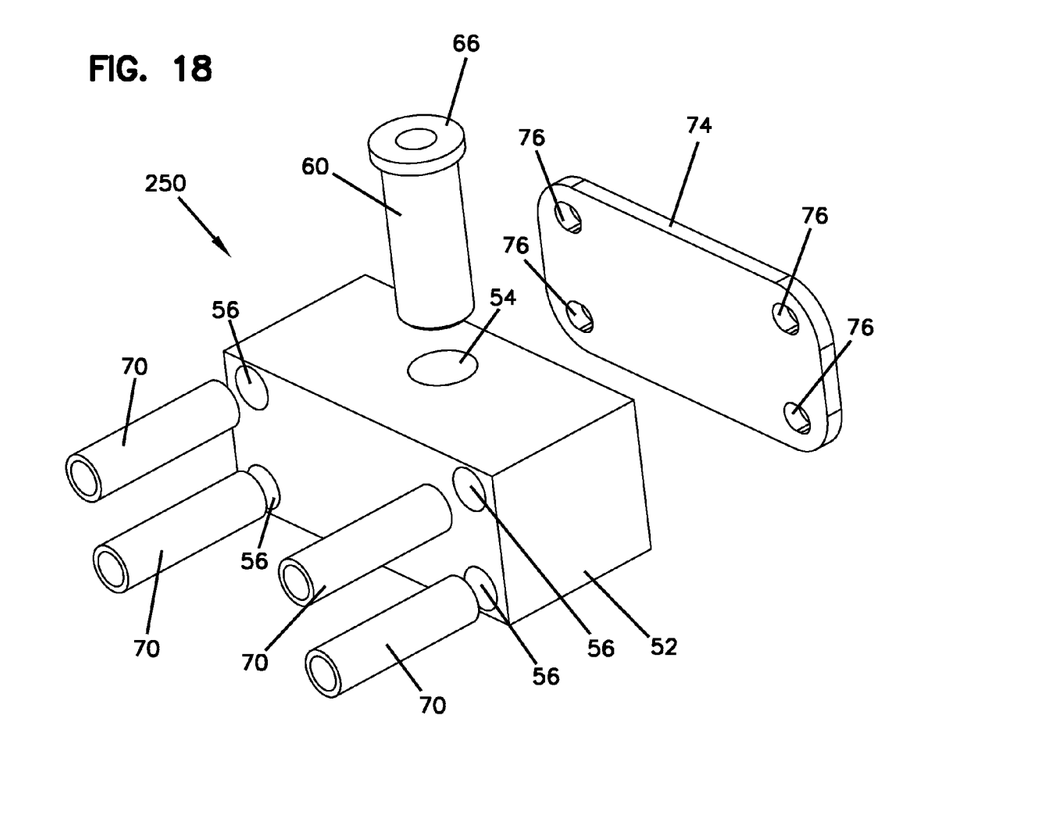
FIG. 18 is an exploded perspective view of the isolator shown in FIG. 17.

Referring now to FIGS. 17-18, there is shown a third embodiment of the isolator assembly generally designated (250). The alternate embodiment is similar in all respects to the isolator assembly (50) shown in FIGS. 7-11 except for the block (52) includes two pairs of mounting orifices (56) receiving four associated sleeves (70) and the backing plate (74) includes four orifices (76) aligned with the mounting orifices (56). The mounting orifices (56) are positioned in opposite pairs on either side of the bushing orifice (54).

When the harvester (100) is in use, the isolator assembly (50) provides cushioning between the skis (22) and the shaker mechanism (20). This provides a damping effect and isolates much of the vibration to and from the trunks of the trees, bushes or vines and decreases damage to the bark while still providing sufficient shaking to remove the fruit. The isolator assembly (50) also decreases vibration feeding back through to the harvester (100) and lessons wear and tear. It has been found that the isolator assemblies have attained a useful life of at least 9 weeks as compared to prior art isolators that have a useful life that may be as short as 2-3 days. Moreover, the performance of the isolator assembly was not diminished over its useful life.

It is to be understood, however, that even though numerous characteristics and advantages of the present invention have been set forth in the foregoing description, together with details of the structure and function of the invention, the disclosure is illustrative only, and changes may be made in detail, especially in matters of shape, size and arrangement of parts within the principles of the invention to the full extent indicated by the broad general meaning of the terms in which the appended claims are expressed.

What is claimed is:

1. A shaker assembly, comprising:
an engagement member configured to engage plants;
a drive mechanism imparting motion to the engagement member;
a mount connecting the engagement member to the drive mechanism, the mount having an elastomeric block; the block having a first side, an opposite second side, a third side and opposite fourth side, the third side and the fourth side extending between the first side and the second side; the block including a first passage formed therein extending from the third side to the fourth side and closer to the second side than the first side; the block having a second passage extending from the first side to the second side;
a first tubular insert extending into the first passage;
a second tubular insert extending into the second passage; and
a plate proximate the second side and having an orifice aligned with the second passage.

2. A shaker assembly according to claim 1, further comprising a fastener extending through the first tubular insert and connecting the mount to the drive mechanism.

3. A shaker assembly according to claim 1, further comprising a fastener extending through the second tubular insert and the orifice in the plate and connecting the mount to the engagement member.

4. A shaker assembly according to claim 1, further comprising a first fastener extending through the first tubular insert in the first passage, and a second fastener extending through the second tubular insert in the second passage and the orifice in the plate.

5. A shaker assembly according to claim 1, wherein the first passage is perpendicular to the second passage.

6. A shaker assembly according to claim 1, wherein the block has a plurality of second passages and a plurality of second tubular inserts, each of the plurality of second tubular inserts extending into a corresponding one of the plurality of second passages.

7. A shaker assembly according to claim 6, further comprising a first fastener extending through the first passage and a plurality of second fasteners, each of the second fasteners extending through a corresponding one of the plurality of second passages and a corresponding one of the plurality of orifices.

8. A shaker assembly according to claim 7, wherein the first passage is perpendicular to the plurality of second passages.

9. A shaker assembly according to claim 1, wherein the block includes two spaced apart second passages and wherein the first passage extends intermediate and perpendicular to the two spaced apart second passages.

10. A shaker assembly according to claim 1, wherein the first tubular insert comprises a bushing with a collar portion extending radially outward at a first end of the first tubular insert.

11. A shaker assembly according to claim 1, wherein the elastomeric block comprises urethane having a hardness of about 95 shore A.

12. A fruit harvester, comprising:
a chassis;
a motor;
wheels;
a shaker assembly, comprising:
an engagement member configured to engage plants;
a drive mechanism imparting motion to the engagement member;
a mount connecting the engagement member to the drive mechanism, the mount having an elastomeric block; the block having a first side, an opposite second side, a third side and an opposite fourth side, the third side and fourth side extending between the first side and the second side; the block including a first passage formed therein extending from the third side to the fourth side and closer to the second side than the first side; the block having a second passage extending from the first side to the second side perpendicular to the first passage;
a first tubular insert extending into the first passage;
a second tubular insert extending into the second passage; and
a plate proximate the second side and having an orifice aligned with the second passage.

13. A harvester according to claim 12, further comprising at fastener extending through the first tubular insert and connecting the mount to the drive mechanism.

14. A harvester according to claim 12, further comprising a fastener extending through the second tubular insert and the orifice in the plate and connecting the mount to the engagement member.

15. A harvester according to claim 12, further comprising a first fastener extending through the first tubular insert in the first passage, and a second fastener extending through the second tubular insert in the second passage and the orifice in the plate.

16. A harvester according to claim 12, wherein the first passage is perpendicular to the second passage.

17. A harvester according to claim 12, wherein the block has a plurality of second passages and a plurality of second tubular inserts, each of the plurality of second tubular inserts extending into a corresponding one of the plurality of second passages.

18. A harvester according to claim 17, further comprising a first fastener extending through the first passage and a plurality of second fasteners, each of the second fasteners extending through a corresponding one of the plurality of second passages and a corresponding one of the plurality of orifices.

19. A harvester according to claim 18, wherein the first passage is perpendicular to the plurality of second passages.

20. A harvester according to claim 12, wherein the block includes two spaced apart second passages and wherein the first passage extends intermediate and perpendicular to the two spaced apart second passages.

* * * * *